United States Patent [19]

Wreede

[11] Patent Number: 5,519,516
[45] Date of Patent: May 21, 1996

[54] ONE WAY HOLOGRAMS

[75] Inventor: John E. Wreede, Azusa, Calif.

[73] Assignee: Hughes Aircraft Company, Los Angeles, Calif.

[21] Appl. No.: 298,912

[22] Filed: Aug. 31, 1994

[51] Int. Cl.⁶ .................. G03H 1/04; G03H 1/26
[52] U.S. Cl. ................... 359/3; 359/13; 359/25
[58] Field of Search .................. 359/3, 20, 22, 359/25, 13, 14; 430/1, 2

[56] References Cited

U.S. PATENT DOCUMENTS

| | | | |
|---|---|---|---|
| 5,196,951 | 3/1993 | Wreede | 359/25 |
| 5,267,060 | 11/1993 | Colton | 359/25 |
| 5,289,298 | 2/1994 | Smith | 359/25 |
| 5,347,435 | 9/1995 | Smith et al. | 359/15 |
| 5,453,339 | 9/1995 | Frost et al. | 359/3 |
| 5,455,692 | 10/1995 | Wreede | 359/13 |

*Primary Examiner*—Martin Lerner
*Attorney, Agent, or Firm*—Leonard A. Alkov; W. K. Denson-Low

[57] ABSTRACT

A hologram structure including a hologram layer including a half-tone pattern of transparent areas and reflection hologram areas, and a non-hologram half-tone pattern of areas that are substantially opaque to the range of wavelengths that comprises the spectral bandwidth of the holograms areas located adjacent the hologram layer, wherein the hologram areas are superimposed with selected areas of the non-hologram half-tone pattern.

1 Claim, 1 Drawing Sheet

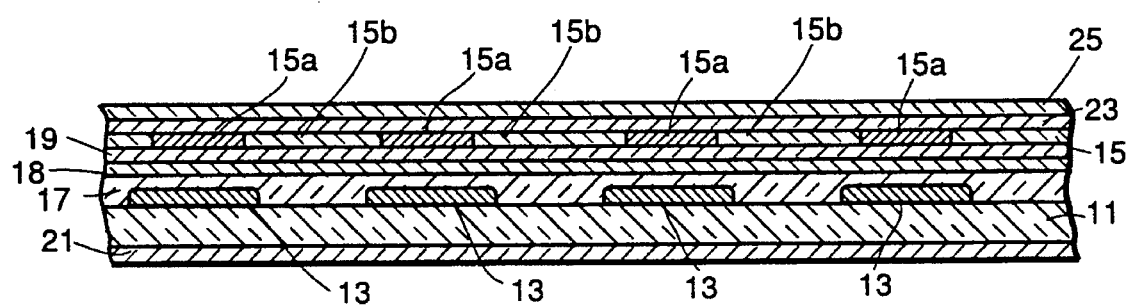
FIG. 1.
FIG. 2.
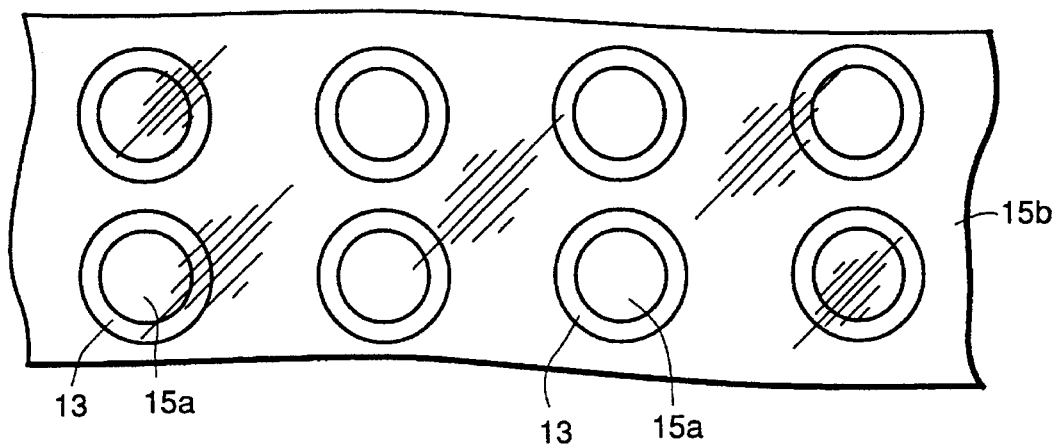

ONE WAY HOLOGRAMS

BACKGROUND OF THE INVENTION

The disclosed invention is generally directed to hologram structures, and more particularly to one way hologram structures wherein a holographic image is visible from one side of a one way hologram structure and not from another side.

Graphical elements including alpha-numeric characters are commonly applied to transparent substrates such as display windows, the top portions of vehicle windshields, and sunglass lenses. Known techniques of applying graphical elements to transparent substrates include printing, stenciling, and application of die cut decals. A consideration with known techniques is the visibility of the graphical elements from the side of the substrate that is opposite the intended viewing side, since such visibility from such opposite side of the substrate could be unwanted or a distraction.

SUMMARY OF THE INVENTION

It would therefore be an advantage to provide a partially transparent laminar hologram structure that is viewable only from an intended viewing side.

Another advantage would be to provide a partially transparent laminar hologram structure that is viewable from one side and which appears uniform from another side.

A further advantage would be to provide a partially transparent laminar hologram structure that produces a first holographic image that is viewable from one side of the structure and a second holographic image that is viewable from the other side of the structure.

The foregoing and other advantages are provided by the invention in a hologram structure that includes a hologram layer including a half-tone pattern of transparent and reflection hologram areas, and a non-hologram half-tone pattern of areas substantially opaque to the spectral bandwidth of the hologram areas located adjacent the hologram layer, wherein the hologram areas are superimposed with selected areas of the non-hologram half-tone pattern.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a simplified schematic sectional illustration of a hologram structure in accordance with the invention.

FIG. 2 is a simplified schematic plan view of a hologram structure in accordance with the invention.

DETAILED DESCRIPTION OF THE DISCLOSURE

In the following detailed description and in the several figures of the drawing, like elements are identified with like reference numerals.

Referring now to FIG. 1, set forth therein is a simplified sectional view that schematically depicts a hologram structure in accordance with the invention which includes a photopolymer hologram layer 15 comprised of a half-tone pattern of reflection hologram areas 15a and transparent non-hologram areas 15b. A half-tone pattern comprised of an array of dots 13 which are substantially opaque to at least the range of wavelengths that comprises the spectral bandwidth of the hologram areas 15a is located adjacent the photopolymer hologram 15. For ease of reference, the dots 13 are referred to herein as selectively opaque dots 13. The dots 13 are formed, for example, on a substantially transparent substrate 11, and the structure comprising the substrate 11 and the array of selectively opaque dots 13 is secured to the photopolymer hologram layer 15 by a substantially transparent adhesive structure comprised of substantially transparent pressure sensitive adhesive layers 17, 19 that are on opposing sides of a substantially transparent support substrate 18, wherein the adhesive layer 17 is adjacent the selectively opaque dots 13 and the portions of the substantially transparent substrate not covered by the selectively opaque dots 13, and wherein the adhesive layer 19 is adjacent the photopolymer hologram layer 15. By way of illustrative example, the adhesive structure comprised of the support substrate 18 and the adhesive layers 17, 19 can comprise a commercially available double sided adhesive tape. Alternatively, the adhesive structure securing the photopolymer hologram 15 to the substantially transparent substrate 11 can comprise single adhesive layer that is polymerized in place with UV light after the adjacent layers are assembled, or a single pressure sensitive adhesive layer that is commercially available in the form of an adhesive layer between peel-off cover sheets.

The selectively opaque dots 13 can be completely or partially light absorbing or reflecting, and are formed in accordance with conventional techniques such as printing, photolithographic masking and etching, or masking and vapor deposition through the mask. The selectively opaque dots 13 and the areas between the selectively opaque dots 13 are sufficiently small such that they cannot be individually readily resolved by human vision at the closest distance intended for viewing the hologram structure.

In accordance with the invention, the hologram areas 15a of the hologram layer 15 are in registration with and superimposed on corresponding selectively opaque dots 13, but are smaller in size than corresponding selectively opaque dots and similar in shape, such that the boundary of each hologram area 15a is located inwardly from the boundary of its corresponding dot 13. In other words, the shape of each hologram area 15a is substantially the same as the shape of its corresponding dot 13, but smaller in size, such that the boundary of the hologram area 15a is inboard of the boundary of the corresponding dot 13 by substantially the same amount along the respective boundaries, and the hologram area is not co-extensive with its corresponding dot 13. The size of a hologram area 15a is sufficiently smaller than the size of its corresponding dot 13 so that hologram image produced by the hologram areas 15a cannot be viewed from the non-hologram side of the substrate 11, and thus the amount of size reduction of the hologram areas 15a relative to their corresponding selectively opaque dots 13 will depend on factors including the distance between the hologram areas 15a and their corresponding selectively opaque dots, the nature of the hologram reconstruction illumination, the possible viewing angles for viewing the hologram, and the possible viewing angles from the non-hologram side of the hologram structure.

FIG. 2 schematically illustrates a hologram structure in accordance with the invention as viewed from the protective cover side, for the illustrative example of circular selectively opaque dots 13 and circular hologram areas 15a that are smaller in diameter than the circular selectively opaque dots 13a.

By way of illustrative example, the hologram layer comprising a half-tone pattern of hologram areas and non-hologram areas can be made by pre-exposing the areas of a hologram recording layer that are to contain the non-hologram areas to incoherent light. For example, the hologram recording layer is masked with a film type mask that includes areas that are substantially opaque to the range of wavelengths that comprises the spectral sensitivity of the hologram recording layer and transparent areas that define the non-hologram areas. The hologram recording layer is then illuminated through the mask with incoherent light such that the areas of the hologram recording layer uncovered by the mask are desensitized so that holograms cannot be formed therein.

By way of particular illustrative example, the substantially transparent substrate 11 that supports the selectively opaque dots 13 can be utilized as a pre-exposure mask prior to being laminarly assembled into the hologram structure of FIG. 1, in which case the selectively opaque dots 13 would be substantially opaque to the range of wavelengths that comprises the spectral sensitivity of the hologram recording layer, whereby the selectively opaque dots 13 will necessarily be substantially opaque to the range of wavelengths that comprises the spectral bandwidth of the hologram areas formed in the hologram recording layer, since the spectral bandwidth of the hologram areas will be smaller than and contained within the spectral sensitivity of the hologram recording layer. The non-pre-exposed areas will be smaller than the selectively opaque dots 13 due to scattering and leaking of light into areas of the hologram layer that are adjacent the selectively opaque dots 13, whereby the areas in which holograms can form will be smaller than the corresponding selectively opaque dots in the pre-exposure mask. The amount of size reduction of the non-pre-exposed areas relative to the selectively opaque dots in the pre-exposure mask is determined by factors including the spacing of the hologram recording layer relative to the half-tone pattern of selectively opaque dots, the type of light source utilized for pre-exposure, and the level of pre-exposure. The spacing of the hologram recording layer relative to the selectively opaque dots of the pre-exposure mask can be controlled for example with a suitable transparent substrate, such as the transparent substrate on which the selectively opaque dots are located and a substrate that supports the hologram recording layer, to the extent that the dot pattern and the pattern of hologram areas can be aligned in the assembly of the hologram structure of FIG. 1.

After appropriate desensitizing to define the non-hologram areas, the hologram areas are formed by conventionally subjecting the selectively desensitized hologram recording layer to hologram constructing illumination. By way of illustrative example, the reflection hologram areas are constructed as three-dimensional image holograms, or as mirror type holograms. The mirror type reflection holograms can be arranged in a pattern such that the region or area occupied by the mirror type hologram areas is in the form of a recognizable graphical shape or shapes, which can be achieved by a second pre-exposure of a hologram recording layer prior to hologram construction. For example, prior to hologram forming exposure, a previously pre-exposed hologram layer is masked to protect the region corresponding to the desired recognizable graphical shape or shapes, and then exposed to incoherent light to desensitize the hologram areas not protected by the mask which will typically be of the same shape as the desired recognizable graphic shape or shapes.

Pursuant to conventional half-tone techniques, the distribution or duty cycle of the selectively opaque dots of the half-tone pattern relative to the areas of the substrate not covered by selectively opaque dots is selected to provide the desired see-through. The duty cycle can be substantially constant across the format of the hologram structure (e.g., selectively opaque dots of uniform size and uniform spacing), or it can vary with location. By way of illustrative example, the pattern can comprise a repetitive pattern such as a pattern of uniformly sized circular selectively opaque dots that are equidistantly spaced from each other, or the pattern can comprise selectively opaque dots that are random in size, shape, and spacing. Also, the half-tone pattern of areas that are substantially opaque to wavelengths that comprise the spectral bandwidth of the hologram areas can comprise the areas between dots on the substrate that are not covered by the half-tone pattern of areas substantially opaque to the spectral bandwidth of the hologram areas, in which case the non-hologram areas in the hologram layer are dots of larger size than the uncovered dots of the substrate, and the hologram areas comprise the areas between the non-hologram dots in the hologram layer.

For the particular illustrative example of an application wherein the hologram structure of FIG. 1 is to be ultimately secured to an installation substrate with the transparent substrate 11 against the installation substrate, for example on the outer side of lenses for sunglasses, a substantially transparent pressure sensitive adhesive layer 21 is disposed beneath the transparent substrate 11 and a transparent protective cover layer 25 is secured to the photopolymer hologram layer 15 by a transparent pressure sensitive adhesive layer 23, for example. A suitable release layer (not shown) would be utilized to protect the adhesive layer 21 until installation. For the application the hologram structure of FIG. 1 is to be ultimately secured to an installation substrate with the hologram layer closest to the installation substrate, for example on the inside top portion of a vehicle windshield, the adhesive layer 21 would be omitted, and the protective cover 25 would comprise a release liner that would be removed for installation of the hologram structure.

While the foregoing particular implementation of the invention includes only one hologram layer, it should be appreciated that a second photopolymer hologram layer can be positioned beneath the transparent substrate 11 so as to be viewable from only the side of the hologram structure on which the second hologram is located. The second photopolymer hologram layer would be structurally similar to the photopolymer hologram layer 15 so as to include reflection hologram areas that are in registration with and superimposed on corresponding selectively opaque dots 13 which should also be substantially opaque to the wavelengths that comprise the spectral bandwidth of the second photopolymer hologram layer, but are smaller in size and similar in shape relative to the corresponding selectively opaque dots, such that a hologram area of the second photopolymer hologram layer would not be co-extensive with its corresponding dot 13. The second photopolymer hologram layer can be configured to produce a holographic image that is different from the holographic image produced by the photopolymer layer 15. In terms of implementation of a hologram structure having first and hologram layers each side of the half-tone array of selectively opaque dots, it should be appreciated that it may be possible to remove the transparent substrate 11 if the array of selectively opaque dots can adhere to the first photopolymer layer when the substrate 11 is removed, after which the second photopolymer layer could be laminarly attached to the first photopolymer layer that is supporting the array of selectively opaque dots.

It should also be appreciated that a plurality of hologram layers, each containing hologram areas in registration with and superimposed on corresponding selectively opaque dots 13, can be laminarly secured to either side of the transparent substrate 11.

A hologram structure in accordance with the invention advantageously provides for viewing of graphical elements on a viewing side of the structure without disturbing the view through the hologram structure from another side and without any transmission flare since no light is transmitted through the hologram areas of the hologram layer. For example, a pair of sunglasses can have a holographic logo that is visible in reflection from the outside, but does not produce in the view seen by the wearer any areas that are darker than the overall tint of the sunglasses. Similarly, an automotive windshield can have a holographic logo formed in the shading at the top of the windshield which is visible in reflection from outside the vehicle, but does not disturb the view of the driver either in shape or color tint transmitted.

Although the foregoing has been a description and illustration of specific embodiments of the invention, various modifications and changes thereto can be made by persons skilled in the art without departing from the scope and spirit of the invention as defined by the following claims.

What is claimed is:

1. A process for making a laminar hologram structure containing a hologram that is viewable from one side of the laminar hologram structure, comprising the steps of:

masking a photopolymer holographic recording layer with a mask that includes a half-tone pattern of areas that are substantially opaque to the wavelengths that comprise the spectral sensitivity of the photopolymer holographic recording layer;

illuminating the masked photopolymer hologram recording layer with incoherent light to form a pattern of desensitized areas and hologram forming areas in the hologram recording layer;

constructing a reflection hologram in selected hologram forming areas of the photopolymer holographic recording layer to form a hologram layer containing hologram areas and non-hologram areas; and attaching the mask to the hologram layer such that the hologram areas are in registration with corresponding opaque areas of the half-tone pattern of the mask.

* * * * *